US007132516B2

(12) United States Patent
Pflieger

(10) Patent No.: US 7,132,516 B2
(45) Date of Patent: Nov. 7, 2006

(54) MONO-OR BISAZO COPPER COMPLEX DYESTUFFS

(75) Inventor: Dominique Pflieger, Tagsdorf (FR)

(73) Assignee: Clariant Finance (BVI) Limited, Tortola (VG)

( * ) Notice: Subject to any disclaimer, the term of this patent is extended or adjusted under 35 U.S.C. 154(b) by 193 days.

(21) Appl. No.: 10/502,841

(22) PCT Filed: Jan. 29, 2003

(86) PCT No.: PCT/IB03/00303

§ 371 (c)(1),
(2), (4) Date: Jul. 28, 2004

(87) PCT Pub. No.: WO03/064537

PCT Pub. Date: Aug. 7, 2003

(65) Prior Publication Data

US 2005/0020822 A1    Jan. 27, 2005

(30) Foreign Application Priority Data

Jan. 31, 2002    (GB) ................... 0202195.4

(51) Int. Cl.
*C09B 45/18*    (2006.01)
*C09B 45/28*    (2006.01)
*C09D 5/00*    (2006.01)
*C09D 11/02*    (2006.01)
*G03G 9/09*    (2006.01)

(52) U.S. Cl. .............. 534/602; 534/693; 534/716; 534/723; 106/31.51; 106/31.52; 430/108.23

(58) Field of Classification Search .............. 534/602, 534/693, 716, 723; 106/31.51, 31.52; 430/108.23
See application file for complete search history.

(56) References Cited

U.S. PATENT DOCUMENTS

| 3,600,377 | A | 8/1971 | Stingl et al. ............ 534/876 |
| 4,058,515 | A | 11/1977 | Stingl et al. ............ 534/651 |
| 5,563,260 | A | 10/1996 | Kaul et al. ............. 540/133 |
| 5,882,360 | A | 3/1999 | Bauer et al. ............. 8/661 |
| 2002/0028401 | A1 | 3/2002 | Macholdt et al. ....... 430/108.23 |

FOREIGN PATENT DOCUMENTS

| EP | 0176730 | 4/1986 |
| EP | 0982371 | 3/2000 |
| EP | 1168090 | 1/2002 |
| GB | 2272702 | 5/1994 |
| GB | 2285990 | 8/1995 |
| WO | WO 98 05717 | 2/1998 |

*Primary Examiner*—Fiona T. Powers
(74) *Attorney, Agent, or Firm*—Anthony A. Bisulca

(57) ABSTRACT

This invention relates to coppered azo dyestuffs containing an alkyl-, aryl or alkoxyalkyl sulfamyl group on one moiety of the molecule and an alkyl-, aryl or alkoxyalkyl ammonium sulfonate or carboxylate group on the other moiety. The invention also relates to various intermediates, to compositions and to processes for preparing the metalized dyestuffs. The compounds are particularly suited for the application in laquers, ink-jet inks and electrographic toners.

12 Claims, No Drawings

MONO-OR BISAZO COPPER COMPLEX DYESTUFFS

This invention relates to coppered azo dyestuffs containing an alkyl-, aryl or alkoxyalkyl sulfamyl group on one moiety of the molecule and an alkyl-, aryl or alkoxyalkyl ammonium sulfonate or carboxylate group on the other. The invention also relates to various intermediate dyestuffs used in the preparation of the metalized dyes, to compositions, and to processes for preparing the metalized dyestuffs.

One class of solvent soluble dyes known in the art are chromium based complex dyes which are highly soluble in solvents such as alcohols or ketons and are practically insoluble in water. On the one hand chromium based solvent soluble dyes have very advantageous properties, in particular high lightfastness, but on the other hand chromium based dyes are increasingly under concern due to environmental reasons. Therefore there is a need for suitable non chromium based solvent soluble dyes.

Unmetalized monoazo dyestuffs containing a sulfonic acid group on the coupling component and a substituted sulfamyl group on the diazocomponent are known from U.S. Pat. No. 3,600,377. Although these dyestuffs have good purity and brightness of shade and demonstrate good levelling properties, the light fastness of these compounds is not exceptional. The described unmetalized monoazo dyestuffs are water-soluble and are preferably used for dyeing synthetic polyamide fibres.

U.S. Pat. No. 4,058,515 describes how the light fastness of monoazo dyestuffs on polyamide fibres as of U.S. Pat. No. 3,600,377 can be improved by coppering said dyestuffs. The disclosed metalized monoazo dyestuffs carry a sulfonamide group on the diazo component and a sulfonic acid group, an alkali sulfonate or ammonium sulfonate on the coupling component. The described metalized dyestuffs are at least partly soluble in water and are insoluble in other solvents.

The European Patent EP 982 371 B1 discloses metalized bisazo dyestuffs of the general formula shown below,

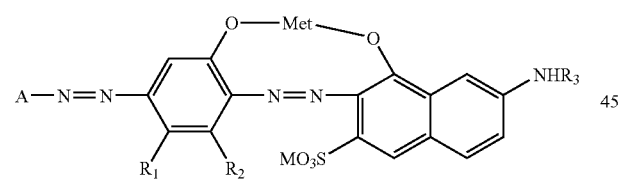

wherein A is substituted phenyl with at least one sulpho, carboxy or carboxyalkyl group, M is hydrogen, a metal cation, preferentially an alkali metal cation or an ammonium cation or an ammonium cation substituted with alkyl, alkoxyalkyl or hydroxylalkyl radicals each having 1 to 12 C atoms and Met is Cu, Ni or Zn. The disclosed dyestuffs are used for ink-jet inks and are at least partly soluble in water. All examples disclosed are sodium salts of the metalized bisazodyestuffs.

Surprisingly, it has now been found, that the solubility of copper complex azo dyestuffs in solvents can be significantly improved if said dyestuffs have an alkyl-, aryl or alkoxyalkyl sulfamyl group on one moiety, preferably the disazocomponent of the molecule, and have an alkyl-, aryl or alkoxyalkyl ammonium sulfonate or carboxylate group on the other moiety, preferably the coupling component. The compounds of the invention are soluble in particular in alcohols and ketons and are insoluble in hydrocarbons and practically insoluble in water.

Solvent soluble dyes as described in this application are defined as being on the one hand highly soluble in solvents such as alcohols or ketones, and on the other hand being practically insoluble in water. A test well established in the art for solvent soluble dyes is there so called "water fastness".

This invention relates to coppered azo dyestuffs containing an alkyl-, aryl or alkoxyalkyl sulfamyl group on one moiety of the molecule and an alkyl-, aryl or alkoxyalkyl ammonium sulfonate or carboxylate group on the other moiety. The invention also relates to various intermediates and to processes for preparing the metalized dyestuffs. The compounds are particularly suited for the application in solvent based laquers and solvent based resin systems as well as in non-aqueous printing inks, in inks for ink-jet applications and in electrographic toners.

The solvent soluble mono- or disazo 1:1 copper complex dye compounds according to the invention comprise a diazo component substituted by at least one alkyl-, aryl or alkoxyalkyl-sulfamyl group and a coupling component substituted by at least one alkyl-, aryl or alkoxyalkyl-ammonium sulfonate or carboxylate group. Due to the fact that coupling reactions to obtain the azo dyestuffs may be carried out starting from inverted diazo and coupling components the coupling component may be the one substituted by at least one alkyl-, aryl or alkoxyalkyl-sulfamyl group and the diazo component may be the one substituted by at least one alkyl-, aryl or alkoxyalkyl-ammonium sulfonate or carboxylate group. For the compounds according to the invention it is important that each component is at least substituted with either an alkyl-, aryl or alkoxyalkyl-sulfamyl group, an alkyl-, aryl or alkoxyalkyl-ammonium sulfonate or an alkyl-, aryl or alkoxyalkyl-ammonium carboxylate group.

A mono- or bisazo 1:1 copper complex dye compound according to the invention comprises the residue of a mono- or bisazo dye compound according to general formula

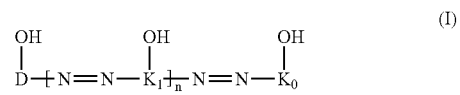

wherein n is 0 or 1,

D is the residue of a diazo component D' substituted by at least one N—$C_{1-6}$alkyl-, N—$C_{6-10}$aryl- or N—$C_{1-6}$alkoxyalkyl-sulfamyl group, with the diazo component D' being selected from the group consisting of substituted or unsubstituted phenol, substituted or unsubstituted naphtol, $K^0$ and $K^1$ are the residues of coupling components $K_0'$ and $K_1'$ substituted by at least one N—$C_{1-6}$alkyl-, N—$C_{6-10}$aryl or N—($C_{1-6}$alkoxyalkyl)-ammonium sulfonate or carboxylate group, with the coupling component $K_0'$ being selected from the group consisting of substituted or unsubstituted phenol, substituted or unsubstituted naphtol, substituted or unsubstituted 1-phenyl-5-pyrazolone, substituted or unsubstituted 1-naphtyl-5-pyrazolone and the coupling component $K_1'$ being selected from the group consisting of substituted or unsubstituted phenol, substituted or unsubstituted naphtol.

The further substituents of the phenol, naphtol, 1-phenyl-5-pyrazolone and 1-napthyl-5-pyrazolone are hydroxy, methyl, methoxy and halogen, preferably chloro.

For the monoazo compounds n is 0 and for the bisazo compounds n is 1.

Preferred monoazo 1:1 copper complex dyestuffs according to the invention can be described by the general formulae (IIa) and (IIb)

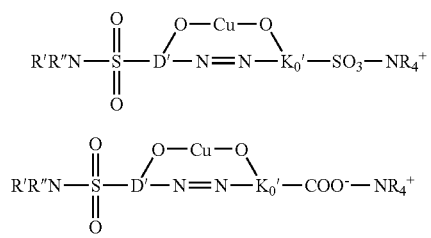

wherein
D' and $K_0'$ are defined as above,
the four R independently are hydrogen, $C_{1-12}$alkyl, $C_{6-10}$aryl, $C_{1-12}$alkoxyalkyl, with the proviso that not all four R are hydrogen,
R' is hydrogen, $C_{1-6}$alkyl, $C_{6-10}$aryl, $C_{1-6}$alkoxyalkyl and R" is $C_{1-6}$alkyl, $C_{6-10}$aryl, $C_{1-6}$alkoxyalkyl.

Preferably R' is hydrogen and R" is selected from methyl, ethyl, n-propyl, phenyl, n-methoxypropyl, methoxyethyl or ethoxyethyl.

In the ammonium ions to the sulfonate or carboxylate groups, preferably three R are hydrogen and one R is selected from $C_{1-12}$alkyl, $C_{6-10}$aryl, $C_{1-12}$alkoxyalkyl.

$NR_4^+$ most preferably is 1,1-di-n-propylhexylene ammonium or a mixture of the corresponding isomers or 2'-ethylhexyloxy-n-propylene ammonium.

Preferred disazo 1:1 copper complex dyestuffs according to the invention can be described by the general formula (IIIa) and (IIIb)

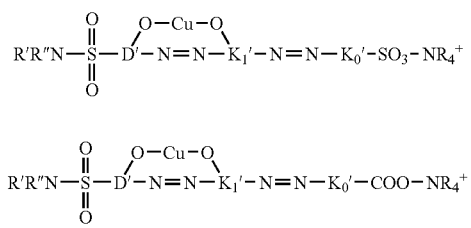

wherein
D', $K_1'$ and $K_0'$ are defined as above,
the four R independently are hydrogen, $C_{1-12}$alkyl, $C_{6-10}$aryl, $C_{1-12}$alkoxyalkyl, with the proviso that not all four R are hydrogen,
R' is hydrogen, $C_{1-6}$alkyl, $C_{6-10}$aryl, $C_{1-6}$alkoxyalkyl and R" is $C_{1-6}$alkyl, $C_{6-10}$aryl, $C_{1-6}$alkoxyalkyl.

Preferably R' is hydrogen and R" is selected from methyl, ethyl, n-propyl, phenyl, n-methoxypropyl, methoxyethyl or ethoxyethyl.

In the ammonium ions of the sulfonate or carboxylate groups, preferably three R are hydrogen and one R is selected from $C_{1-12}$alkyl, $C_{6-10}$aryl, $C_{1-12}$alkoxyalkyl.

$NR_4^+$ most preferably is 1,1-di-n-propylhexylene ammonium or a mixture of the corresponding isomers or 2'-ethylhexyloxy-n-propylene ammonium.

The phenol or naphtol residue $K_1'$ may be substituted by one or more sulfonium or carboxylate groups with a counterion $NR_4^+$ as described above.

The mono- or bisazo 1:1 copper complex dye compounds according to the invention can be prepared by i) metalizing a mono- or bisazo dye compound according to general formula (I) or (Ia)

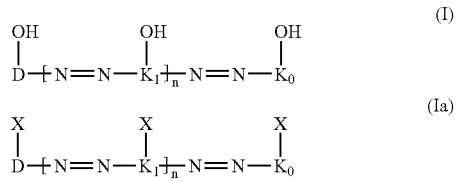

wherein D, $K_0$, $K_1$ and n are defined as above and X is hydroxy or methoxy, with a copper salt, ii) reacting the metalized complex with the respective alkyl-, aryl- or alkoxyalkyl amine and iii) precipitating the 1:1 copper complex dye from an acidified aqueous or non-aqueous suspension.

The metalization according to i) can be readily achieved by treating the corresponding unmetalized, o,o'-dihydroxy azo dyestuff or o-methoxy-o'-hydroxy azo dyestuff with a copper salt in an aqueous or nonaqueous medium by known methods, such as reaction of the azo dyestuff with copper sulphate in the presence of water and sodium acetate or ammonia, or with cupric nitrate in the presence of soda ash and an appropriate solvent near the reflux temperature of the system until the reaction is complete.

Salt formation is the reaction according to ii) with the respective alkyl-, aryl- or alkoxyalkyl amine and iii) the precipitation of the complex salt from the acidified aqueous or non-aqueous suspension.

The unmetalized dyestuffs according to formula (I) may be prepared by diazotizing an aminobenzene compound of the formula (IV) or a naphtylamine of the formula (V) in a first step.

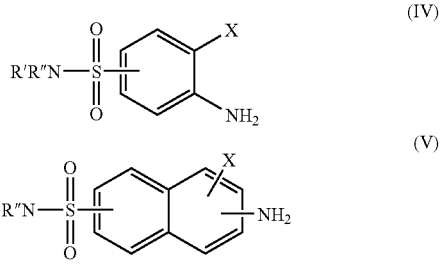

wherein X is hydroxy or methoxy in ortho-position to the amino group. R' and R" are defined as above.

In a second step the diazotized compound is coupled to a naphtol ammonium sulfonate or a sulfophenylpyrazolone by well-known methods.

Alternatively the coupling can be done in reverse order by combining a diazotized ortho-aminohydroxy- or ortho-aminomethoxynaphtalene ammonium sulfonate with phenolic compounds of the formula (VI) or naphtolic compounds of the formula (VII)

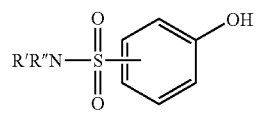
(VI)

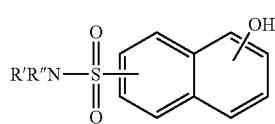
(VII)

wherein the hydroxy group is in 1- or 2-position and the alkyl-, aryl- or alkoxyalkyl sulfamyl group is attached in any position other than 1 or 2. R' and R" are defined as above.

Diazo components of formula (IV) or (V) and couplers of formula (VI) or (VII) above are known compounds and can be prepared by methods well known to those skilled in the art.

Preferred diazo components and coupling components are shown in the following table.

TABLE 1

Preferred diazo components D and coupling components $K_1$ and $K_0$

| Diazo component D | Coupling component $K_1$ | Coupling component $K_0$ |
|---|---|---|
| 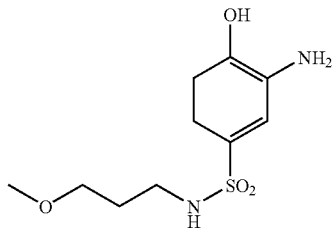 | 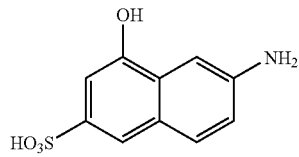 | 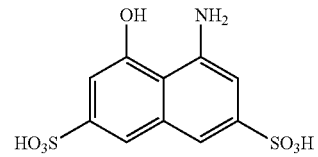 |
| 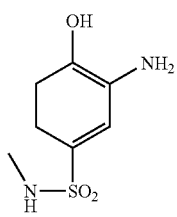 | 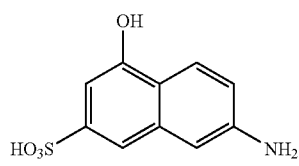 | 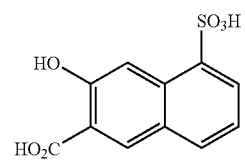 |
| 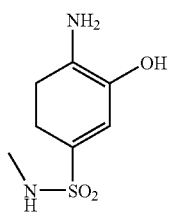 | 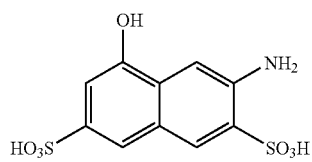 | 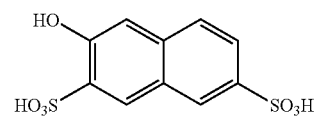 |
|  | 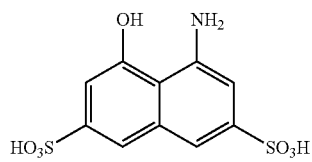 | 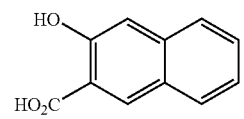 |
|  |  | 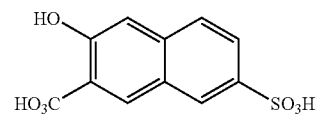 |

TABLE 1-continued

Preferred diazo components D and coupling components $K_1$ and $K_0$

| Diazo component D | Coupling component $K_1$ | Coupling component $K_0$ |
|---|---|---|
| | | 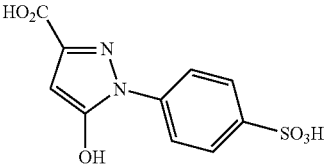 |

A general synthesis of the monoazo compounds is given by the reaction scheme below:

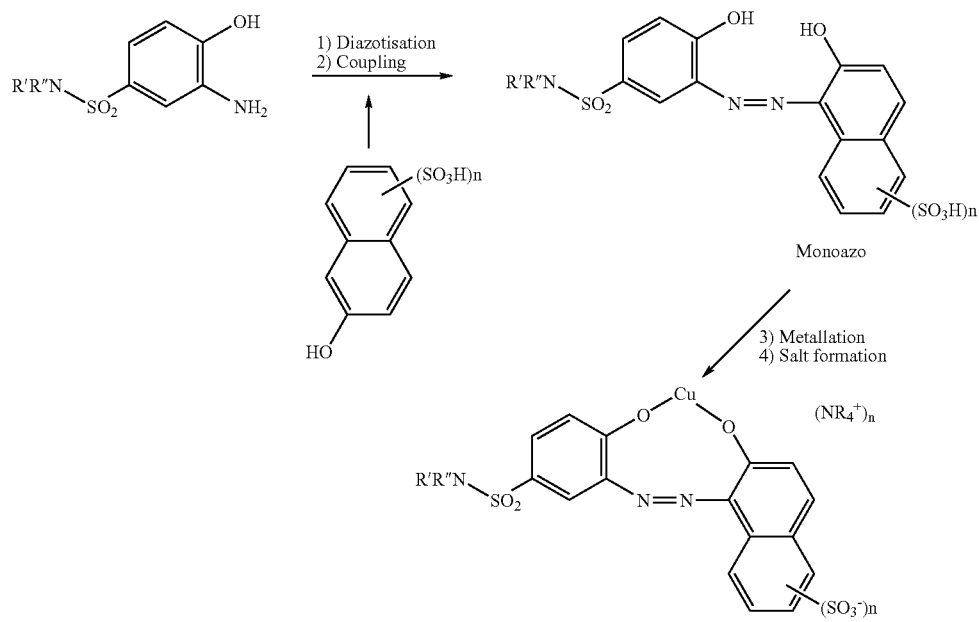

Monoazo

A general synthesis of the bisazo compounds is given by the reaction scheme below:

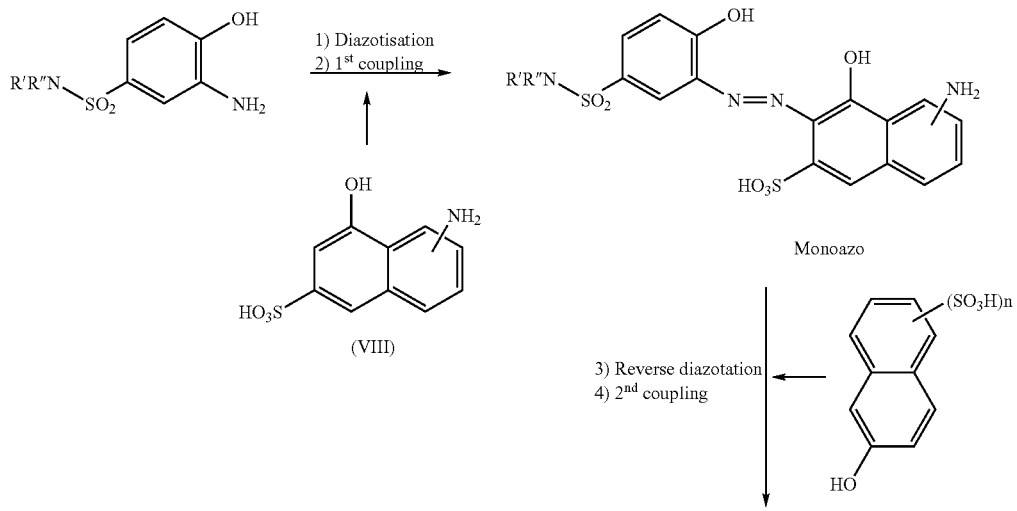

(VIII)

Monoazo

3) Reverse diazotation
4) 2$^{nd}$ coupling

-continued

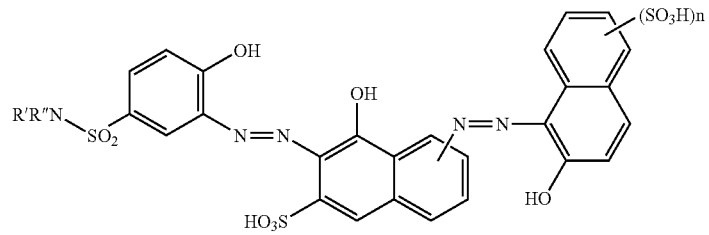

Bisazo

5) Metallation
6) Salt formation

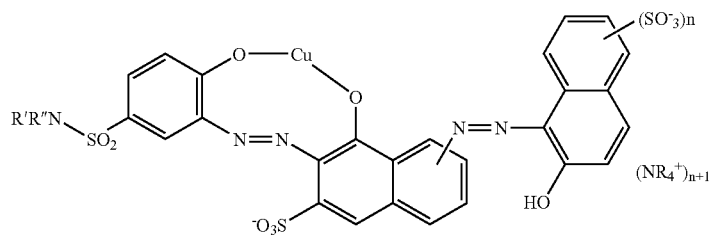

Particularly preferred coupling components for the first coupling are compounds known as gamma-acid (formula VIII), j-acid (formula IX) or h-acid (formula X)

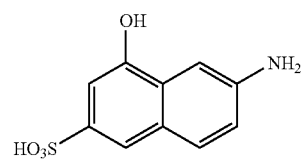
(VIII)

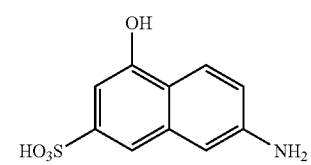
(IX)

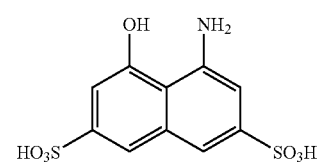
(X)

The new soluble dye compounds according to the invention are suitable for dyeing (especially dyeing in the mass) of plastics including solvent-free and solvent containing plastics masses and solvent-free or solvent containing plastics resins. Further they are suitable for finishes, oil or water based paints, for laquers, for spin dyeing of viscose or cellulose acetate, for dyeing of natural or synthetic polyamides, polyester, polyethylene, polystyrene, polyvinylchloride, rubber or synthetic leather. The new compounds can also be used for printing of graphic material, including textiles and paper, for dyeing of paper masses and for coating of textile and leather.

Dyeings with the new compounds have good properties, for example high light fastness, good heat withstanding properties, good weathering properties, good chemical resistance, good migration properties, low blooming, good overcoating properties, good fastness in solvents, high tinting strength and good application properties (e.g. flocculation fastness).

The dye compounds according to the invention are suitable as colorants in solvent based ink-jet inks, for printing paper or papery substrates, textile fibre materials, plastic films and plastic transparencies.

The dye compounds according to the invention are also suitable as colorants in electrophotographic toners and developers, such as one- or two-component powder toners (also called one- or two-component developers), magnetic toners, liquid toners, polymerisation toners and speciality toners.

The dye compounds according to the invention are further suitable as charge control agents.

The mono- or bisazo 1:1 copper complex dye compounds according to the invention are particularly useful as dyestuffs in laquers and as dyestuffs or charge control agents in ink-jet inks or electrographic toners.

The following examples illustrate the invention. Unless otherwise specified, parts and percentages used in the examples are on a weight to weight basis.

EXAMPLE 1 a) 26.0 parts of 2-amino-4-(3'-methoxypropylamino-sulfonyl) phenol are stirred into a mixture of 200 parts of water and 35 parts of 30% HCl. After the addition of 50 parts of ice, the amine is diazotised by the addition of 26.2 parts by volume of 4N $NaNO_2$ solution. The resulting suspension is stirred for 3 hours at 0° C. and then slowly poured into a solution of 18.8 parts of 2-hydroxynaphthalene-3-carboxylic acid (BON acid) in 115 parts of water and 13.0 parts of 30% NaOH. By the simultaneous addition of a further 7.0 parts of 30% NaOH, the pH is brought to 9.5–10. The resulting mixture is then stirred at room temperature for 8 hours and brought to pH 1.5 by the addition of 30% HCl. The resulting precipitate is filtered, washed with 600 parts of water and dried.

b) 20 parts of the monoazo dyestuffs of part a) above are suspended in 125 parts of water, 6.3 parts of dipropylene glycol monomethyl ether and 8.9 parts of sodium acetate hydrate. After warming at 96° C. for over one hour, 10.8 parts of copper sulphate hydrate are added in small portions for over one hour, whereupon a voluminous suspension of the copper complex results. The temperature is allowed to fall to 45° C. over 2 hours (while stirring well) and the suspension is slowly reacted with a solution of 8.0 parts of $C_{12}$–$C_{14}$ tert.-Alkylamine (e.g. commercial product known as "Primene® 81R" (Primene is a registered trademark of Rohm and Haas)) in 20 parts of water and 5.3 parts of 30% HCl. The resulting precipitate is adjusted to pH 2.5 by the addition of about 1 part of 30% HCl. The mixture is stirred a further hour at room temperature, filtered and the residue is washed salt free and then dried. A compound of the formula

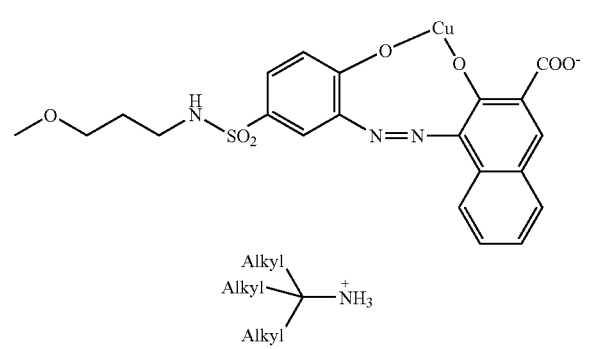

is obtained.

EXAMPLE 2 a) 264.1 parts of 2-amino-4-(3'-methoxypropylamino-sulfonyl) phenol are stirred into a mixture of 2000 parts of water and 350 parts of 30% HCl. After the addition of 500 parts of ice, the amine is diazotised by the addition of 305 parts by volume of 4N $NaNO_2$ solution. The resulting suspension is stirred for 3 hours at 0° C. and then slowly poured into a solution of 203.6 parts of 2-amino-8-hydroxy-naphthalene-6-sulfonic acid (gamma acid) in 600 parts of water and 123.7 parts of 30% NaOH. By the simultaneous addition of a further 130.0 parts of 30% NaOH, the pH is brought to 9.5–10. The resulting mixture is then stirred at room temperature for 8 hours and brought to pH 1.5 by the addition of 30% HCl. The resulting precipitate is filtered and dried.

b) 221.5 parts of the monoazo dyestuffs of part a) above are stirred into a mixture of 400 parts of water, 53.2 parts of 30% NaOH and 38.0 parts by volume of 4N $NaNO_2$ solution. The resulting solution is slowly poured into 500 parts of ice and 111.6 parts of 30% HCl resulting in a suspension of diazonium salt that is stirred for 2 hours at 5° C. This slurry is slowly poured into a solution of 38.9 parts of 3-carboxy-2-naphthol-8-sulfonic acid in 300 parts of water and 25.3 parts of 30% NaOH. By the simultaneous addition of a further 110.0 parts of 30% NaOH, the pH is brought to 9.5–10. The resulting mixture is then stirred at room temperature for 8 hours and brought to pH 1.5 by the addition of 30% HCl. 360.0 parts of solid sodium chloride are then added, resulting in an voluminous precipitate build-up that is filtered and dried.

c) 15.8 parts of the bisazo dyestuffs of part b) above are suspended in 90 parts of water, 4.5 parts of dipropylene glycol monomethyl ether and 5.4 parts of sodium acetate. After warming at 96° C. for over one hour, 5.5 parts of copper sulphate are added in small portions for over one hour, whereupon a voluminous suspension of the copper complex results. The temperature is allowed to fall to 45° C. over 2 hours (while stirring well) and the suspension is slowly reacted with a solution of 11.1 parts of $C_{12}$–$C_{14}$ tert.-Alkylamine (e.g. commercial product known as "Primene® 81R" (Primene is a registered trademark of Rohm and Haas)) in 25 parts of water and 7.1 parts of 30% HCl. The resulting precipitate is stirred a further hour at room temperature, filtered and the residue is washed salt free and dried. A compound of formula

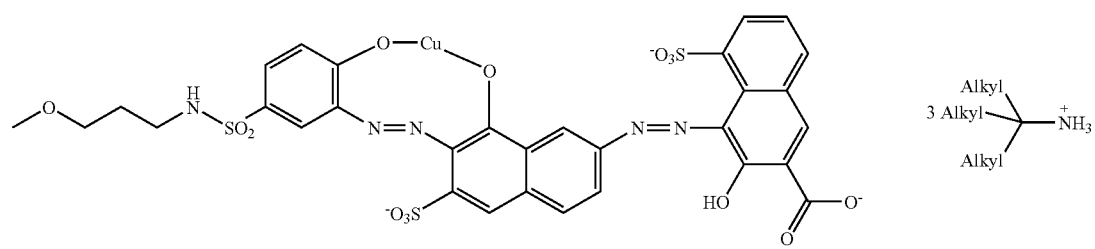

is obtained.

The invention claimed is:

1. A mono- or bisazo 1:1 copper complex dye compound comprising the residue of a mono- or bisazo dye compound according to general formula (I)

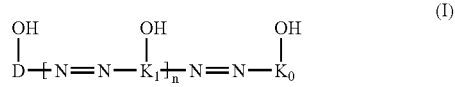

wherein n is 0 or 1,

D is the residue of a diazo component D' substituted by at least one N—$C_{1-6}$alkyl-, N—$C_{6-10}$aryl or N—$C_{1-6}$alkoxyalkyl-sulfamyl group,
  with the diazo component D' selected from the group consisting of substituted or unsubstituted phenol and substituted or unsubstituted naphtol,
$K^0$ and $K^1$ are the residues of coupling components $K_0'$ and $K_1'$ substituted by at least one N—$C_{1-6}$alkyl-, N—$C_{6-10}$aryl or N—$C_{1-6}$alkoxyalkyl-ammonium sulfonate or carboxylate group,
  with the coupling component $K_0'$ selected from the group consisting of substituted or unsubstituted phenol, substituted or unsubstituted naphtol, substituted or unsubstituted 1-phenyl-5-pyrazolone, and substituted or unsubstituted 1-naphtyl-5-pyrazolone
  and the coupling component $K_1'$ selected from the group consisting of substituted or unsubstituted phenol, and substituted or unsubstituted naphtol
with the further substituents of the phenol, naphtol, 1-phenyl-5-pyrazolone and 1-napthyl-5-pyrazolone being hydroxy, methyl, methoxy or halogen.

2. A monoazo 1:1 copper complex dye compound of claim 1 according to general formulae (IIa) or (IIb)

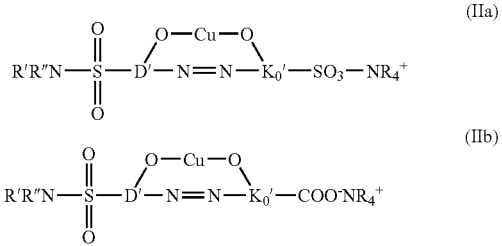

wherein
D' and $K_0'$ are defined as above,
the four R independently are hydrogen, $C_{1-12}$alkyl, $C_{6-10}$aryl, or $C_{1-12}$alkoxyalkyl, with the proviso that not all four R are hydrogen,
R' is hydrogen, $C_{1-6}$alkyl, $C_{6-10}$aryl, or $C_{1-6}$alkoxyalkyl and
R" is $C_{1-6}$alkyl, $C_{6-10}$aryl, or $C_{1-6}$alkoxyalkyl.

3. A bisazo 1:1 copper complex dye compound of claim 1 according to general formulae (IIIa) or (IIIb)

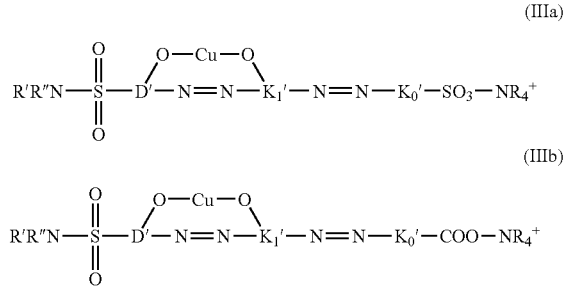

wherein
D', $K_1'$ and $K_0'$ are defined as above,
the four R independently are hydrogen, $C_{1-12}$alkyl, $C_{6-10}$aryl, or $C_{1-12}$alkoxyalkyl, with the proviso that not all four R are hydrogen,
R' is hydrogen, $C_{1-6}$alkyl, $C_{6-10}$aryl, or $C_{1-6}$alkoxyalkyl and
R" is $C_{1-6}$alkyl, $C_{6-10}$aryl, or $C_{1-6}$alkoxyalkyl.

4. A mono- or bisazo 1:1 copper complex dye compound according to claim 1, wherein
R' is hydrogen and
R" is selected from the group consisting of methyl, ethyl, n-propyl, phenyl, n-methoxypropyl, methoxyethyl, and ethoxyethyl.

5. A mono- or bisazo 1:1 copper complex dye compound according to claim 2, wherein the ammonium ions of the sulfonate or carboxylate groups,
three R are hydrogen and
one R is selected from the group consisting of $C_{1-12}$alkyl, $C_{6-10}$aryl, and $C_{1-12}$alkoxyalkyl.

6. A mono- or bisazo 1:1 copper complex dye compound according to claim 5 wherein in the one R in ammonium ions is selected from the group consisting of
1,1-di-n-propylhexylene or its isomers and
2'-ethyl-hexyloxy-n-propylene.

7. Process for the preparation of mono- or bisazo 1:1 copper complex dye compounds according to claim 1 comprising the steps of metallizing a mono- or bisazo dye compound according to general formula (I) or (Ia)

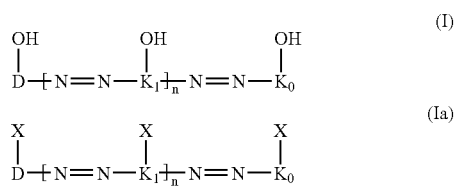

wherein D, $K_0$, $K_1$ and n are defined as in claim 1 and X is hydroxy or methoxy,
  with a copper salt,
  reacting with an alkyl-, aryl- or alkoxyalkyl amine and
  precipitating from the acidified aqueous or non-aqueous suspension.

8. A dyestuff for laquers comprising a mono or disazo 1:1 copper complex dye compound according to claim 1.

9. A charge control agent for ink *et inks or electrographic toners comprising a mono or disazo 1:1 copper complex dye compound according to claim 1.

10. A mono- or bisazo 1:1 copper complex dye compound made in accordance with the process of claim 7.

11. A dyestuff for laquers comprising a mono or disazo 1:1 copper complex dye compound according to claim 10.

12. A charge control agent for ink jet inks or electrographic toners comprising a mono or disazo 1:1 copper complex dye compound according to claim 10.

* * * * *